(12) United States Patent
Smith

(10) Patent No.: US 11,669,597 B1
(45) Date of Patent: Jun. 6, 2023

(54) MULTI-PARTY DATA SCIENCE COLLABORATION

(71) Applicant: Hubbert Smith, Sandy, UT (US)

(72) Inventor: Hubbert Smith, Sandy, UT (US)

(73) Assignee: Hubbert Smith, Sandy, UT (US)

( * ) Notice: Subject to any disclaimer, the term of this patent is extended or adjusted under 35 U.S.C. 154(b) by 51 days.

(21) Appl. No.: 17/409,460

(22) Filed: Aug. 23, 2021

Related U.S. Application Data

(60) Provisional application No. 63/069,333, filed on Aug. 24, 2020.

(51) Int. Cl.
| | |
|---|---|
| *H04L 29/06* | (2006.01) |
| *G06F 21/10* | (2013.01) |
| *H04L 9/40* | (2022.01) |
| *G06F 21/62* | (2013.01) |

(52) U.S. Cl.
CPC .......... *G06F 21/10* (2013.01); *G06F 21/6236* (2013.01); *H04L 63/101* (2013.01); *H04L 63/102* (2013.01)

(58) Field of Classification Search
CPC ... G06F 21/10; G06F 21/6236; H04L 63/101; H04L 63/102
See application file for complete search history.

(56) References Cited

U.S. PATENT DOCUMENTS

| | | | |
|---|---|---|---|
| 8,826,390 B1* | 9/2014 | Varda | G06F 21/6218 726/4 |
| 9,983,759 B1* | 5/2018 | Dhawan | G06F 40/166 |
| 11,240,278 B1* | 2/2022 | Wang | H04L 51/046 |
| 2009/0083378 A1* | 3/2009 | Lingafelt | G06F 15/16 709/204 |
| 2012/0137360 A1* | 5/2012 | Henderson | H04L 63/102 726/17 |
| 2014/0129639 A1* | 5/2014 | Burge | H04L 51/52 709/204 |
| 2015/0347446 A1* | 12/2015 | Faitelson | G06F 16/176 709/204 |
| 2016/0028734 A1* | 1/2016 | Faitelson | G06Q 10/00 726/28 |
| 2020/0311294 A1* | 10/2020 | Sim-Tang | G06F 16/1774 |
| 2021/0012270 A1* | 1/2021 | Lim | G06Q 10/063118 |

* cited by examiner

*Primary Examiner* — Shin-Hon (Eric) Chen
(74) *Attorney, Agent, or Firm* — Patent Law Works LLP

(57) ABSTRACT

The disclosure includes a system and method for multiparty collaboration including creating a first data object associated with first collaboration data, the first collaboration data associated with a first collaborating entity; generating a first object ownership log entry to an object ownership log associated with a collaboration, the first object ownership log entry including first identification information identifying the first data object and a first object owner identifying an owner of the first data object, wherein the first object owner associated with the first data object is the first collaborating entity; generating a first object tracking index entry associated with the first data object; receiving a user request associated with the first data object; and responding to the user request based on one or more of a user whitelist, the object ownership log, and the ownership tracking index.

14 Claims, 11 Drawing Sheets

MULTI-PARTY DATA SCIENCE COLLABORATION

CROSS-REFERENCE TO RELATED APPLICATIONS

The present application claims priority to U.S. Provisional Application No. 63/069,333, filed Aug. 24, 2020, titled "Multi-Party Data Science Collaboration System and Method," the entirety of which is hereby incorporated by reference.

FIELD OF DISCLOSURE

The present disclosure relates generally to systems and methods for collaboration. In particular, the present disclosure relates to systems and methods for multi-party data science collaboration. Still more particularly, the present disclosure relates to systems and methods allow data science collaboration while protecting sensitive data.

Collaboration involving data may be desirable under many circumstances. For example, when digital assets, such as data, code, images, audio, etc. are owned and controlled by different business entities. As another example, when a first entity has data and a second entity has services or expertise to extract useful information from that data and/or future data the first entity may receive.

SUMMARY

This specification relates to methods and systems for multi-party data science collaboration. In general, an innovative aspect of the subject matter described in this disclosure may be implemented in methods that include creating, using one or more processors, a first data object associated with first collaboration data, the first collaboration data associated with a first collaborating entity; generating, using the one or more processors, a first object ownership log entry to an object ownership log associated with a collaboration, the first object ownership log entry including first identification information identifying the first data object and a first object owner identifying an owner of the first data object, where the first object owner associated with the first data object is the first collaborating entity; generating, using the one or more processors, a first object tracking index entry associated with the first data object; receiving, using the one or more processors, a user request associated with the first data object; and responding, using the one or more processors, to the user request based on one or more of a user whitelist, the object ownership log, and the ownership tracking index.

Other implementations of one or more of these aspects include corresponding systems, apparatus, and computer programs, configured to perform the actions of the methods, encoded on computer storage devices.

These and other implementations may each optionally include one or more of the following features. For example, the user request is to copy the first data object to a destination outside a multiparty collaborator, and the features include: determining, using the first object ownership log entry, a first group as the first object owner; determining, using the user whitelist, whether the requesting user is associated with the first group, where the user whitelist includes the user; and denying copy of the first data object to the destination outside a multiparty collaborator responsive to determining the requesting user is not associated with the first group; or allowing copy of the first data object to the destination outside a multiparty collaborator responsive to determining the requesting user is associated with the first group. For example, the user request is to access or copy the first data object subsequent to the request to cease collaboration; determining, using the first object ownership log entry, a first group as the first object owner; determining, using the user whitelist, whether the requesting user is associated with the first group; and denying access or copy of the first data object responsive to determining the requesting user is not associated with the first group; and allowing access or copy of the first data object responsive to determining the requesting user is associated with the first group. For example, the request is to modify the first collaboration data associated with the first data object, and the features may include: receiving a modification to the first collaboration data associated with the first data object; creating a second data object associated with the modified first collaboration data; determining ownership of the second data object is the first object owner. For example, the request to modify the first collaboration data associated with the first data object is received from a user unassociated with the first object owner, and the features may include: determining the ownership of the second data object further may include: comparing the first data object and the second data object; and determining the second data object is derived from first data object. For example, the features include determining that the second data object is derived from the first data object is based on satisfaction of a threshold level of matching. For example, a data plane container or virtual machine performs the creation of the first data object, the generation of the first object ownership log entry, and the generation of the first object tracking index entry, and where a control plane container or virtual machine establishes the user whitelist, the object ownership log, and the ownership tracking index. For example, the user whitelist includes a user name, a unique identifier, a group name, a group identifier, and a role for each user on the whitelist. For example, a group includes users from multiple different entities. For example, a group includes users from a common entity.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
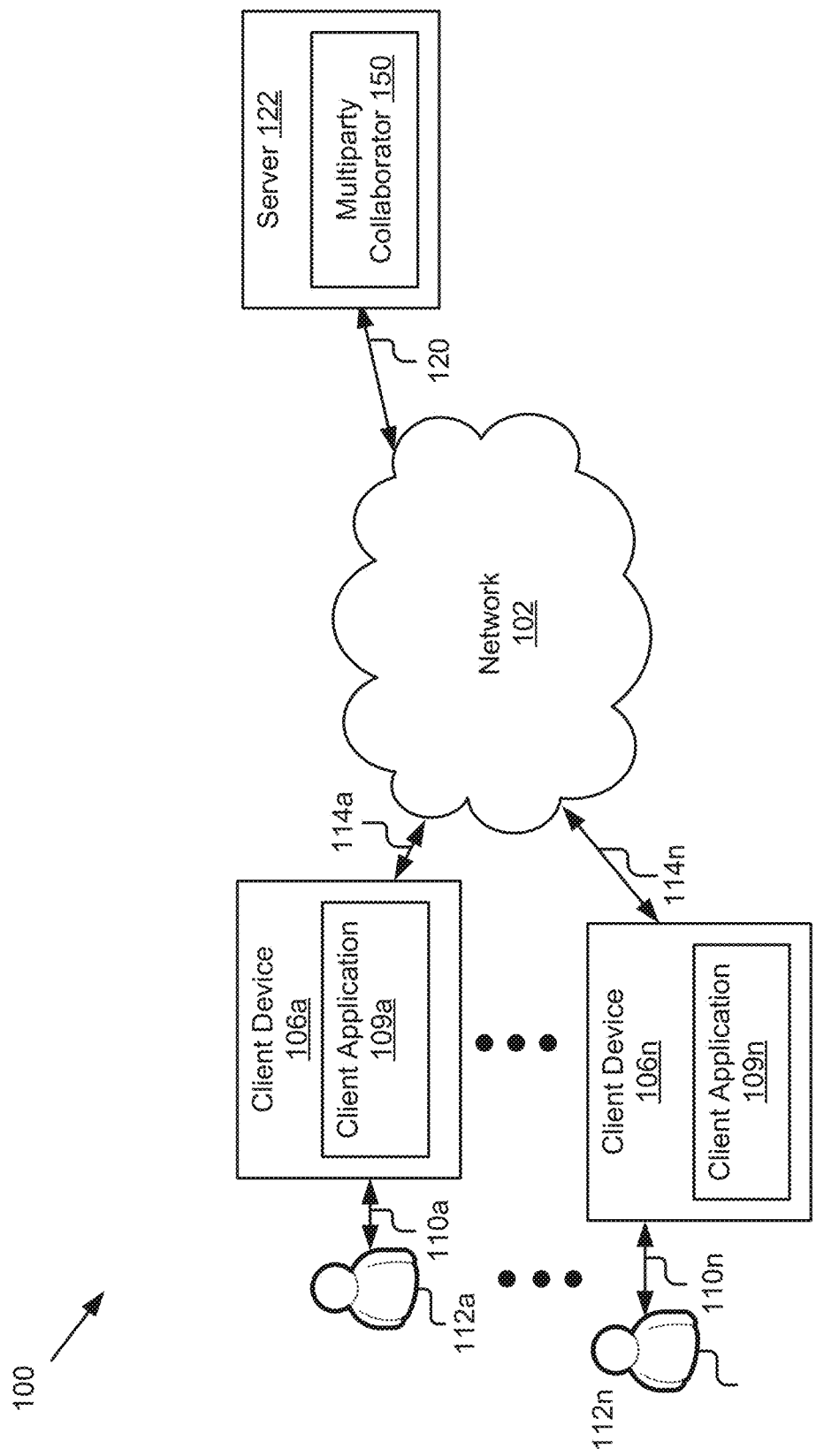
FIG. 1 is a block diagram of one example system for multi-party data science collaboration in accordance with some implementations.

The techniques introduced herein overcome the deficiencies and limitations of the prior art at least in part by providing systems and methods for multi-party data science collaboration. The systems and method of the present disclosure allowing collaboration that protects all parties against unauthorized leakage of sensitive data and tracks chain of data ownership even during data science projects where data undergoes modification and transformations.

The systems and method of the present disclosure has a number advantages over prior art system and methods.

First, systems and methods of the present disclosure may advantageously provide multi-lateral protection. Existing solutions for collaboration merely provide unilateral protection. For example, existing security systems allow a host entity to grant system access to an external party, occasionally referred to herein as a "guest," "outsider," or similar. However, such systems only protect the host entity. There is no mechanism by which the guest can control or protect guest-owned digital assets, such as data, code, or intellectual property put into the hosts system.

Second, the systems and methods of the present disclosure may advantageously provide protection without hindering data science applications. For example, existing systems may obfuscate data of a first party and send that to a second, external party. However, obfuscation of the data may destroy the usability of the data for many data science applications. For example, obfuscation of the data may make an AI/ML model trained on the obfuscated data may not work, or work as well, when implemented and applied to un-obfuscated data. As another example, the obfuscated data may make natural language processing more difficult.

Third, the systems and methods of the present disclosure may advantageously facilitate federated learning while maintaining privacy. For example, data from many data sources may be accessed and used to train one or more AI/ML models, such as in federated learning, but the data may not be copied or removed from the collaboration environment.

Fourth, the systems and method of the present disclosure advantageously efficiently provides security and data observability. For example, existing systems my utilize homomorphic encryption (HE). However, HE utilizes multiple CPU-expensive encryption and decryption operations any time data is touched (e.g., every query, read, write, swap, cache, etc.).

Fifth, the systems and methods of the present disclosure allow project leaders a simple, self-service ability to create multiparty collaboration instance(s) without the risk of SYSADMIN operating system privilege abuse. As described herein the system and methods described herein avoids the risk by avoiding the need for sysadmin, and allowing the project lead to do what is needed without granting anyone sysadmin privileges.

All of these above advantages are achieved by the systems and methods of the present disclosure which include allowing collaboration that protects all parties against unauthorized leakage of sensitive data and tracks chain of data ownership even during data science projects where data undergoes modification and transformations.

Example System

FIG. 1 is a block diagram of one example system for multi-party data science collaboration in accordance with some implementations. As depicted, the system 100 includes a server 122 and client devices 106a and 106b coupled for electronic communication via a network 102. The client devices 106a or 106b may occasionally be referred to herein individually as a client device 106 or collectively as client devices 106. Although two client devices 106a and 106b are shown in FIG. 1, it should be understood that there may be any number of client devices 106.

A client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, thin clients, etc.

It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

In some implementations, the client device 106 includes an application 109. Depending on the implementation, the application may include a dedicated application or a browser (e.g., a web browser, such as Chrome, Firefox, Edge, Explorer, Safari, or Opera). In some implementations, a user 112 accesses the features and functionalities of the multi-party collaborator 150 via the application 109.

In some implementations, the network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate. In some implementations, the network 102 may be, or include, an interconnect fabric.

The server 122 is a computing device that includes a hardware and/or virtual server that includes a processor, a memory, and network communication capabilities (e.g., a communication unit). The server 122 may be communicatively coupled to the network 102, as indicated by signal line 120. In some implementations, the server 122 may send and receive data to and from other entities of the system 100 (e.g., one or more client devices 106). Some implementations for the server 122 are described in more detail below with reference to FIG. 2.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 122 to a client device 106, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc. For example, depending on the implementation, the multiparty collaborator 150 may be entirely server-side, entirely client-side, or distributed between the client-side and server side.

As another example, while only a single server 122 is illustrated, the server 122 may represent a plurality of servers (e.g., a server farm or distributed, cloud environment), and the server 122, in some implementations, may, therefore, include multiple instances (e.g., in different hardware servers, virtual machines, or containers) of the multiparty collaborator 150.

Figure 2:
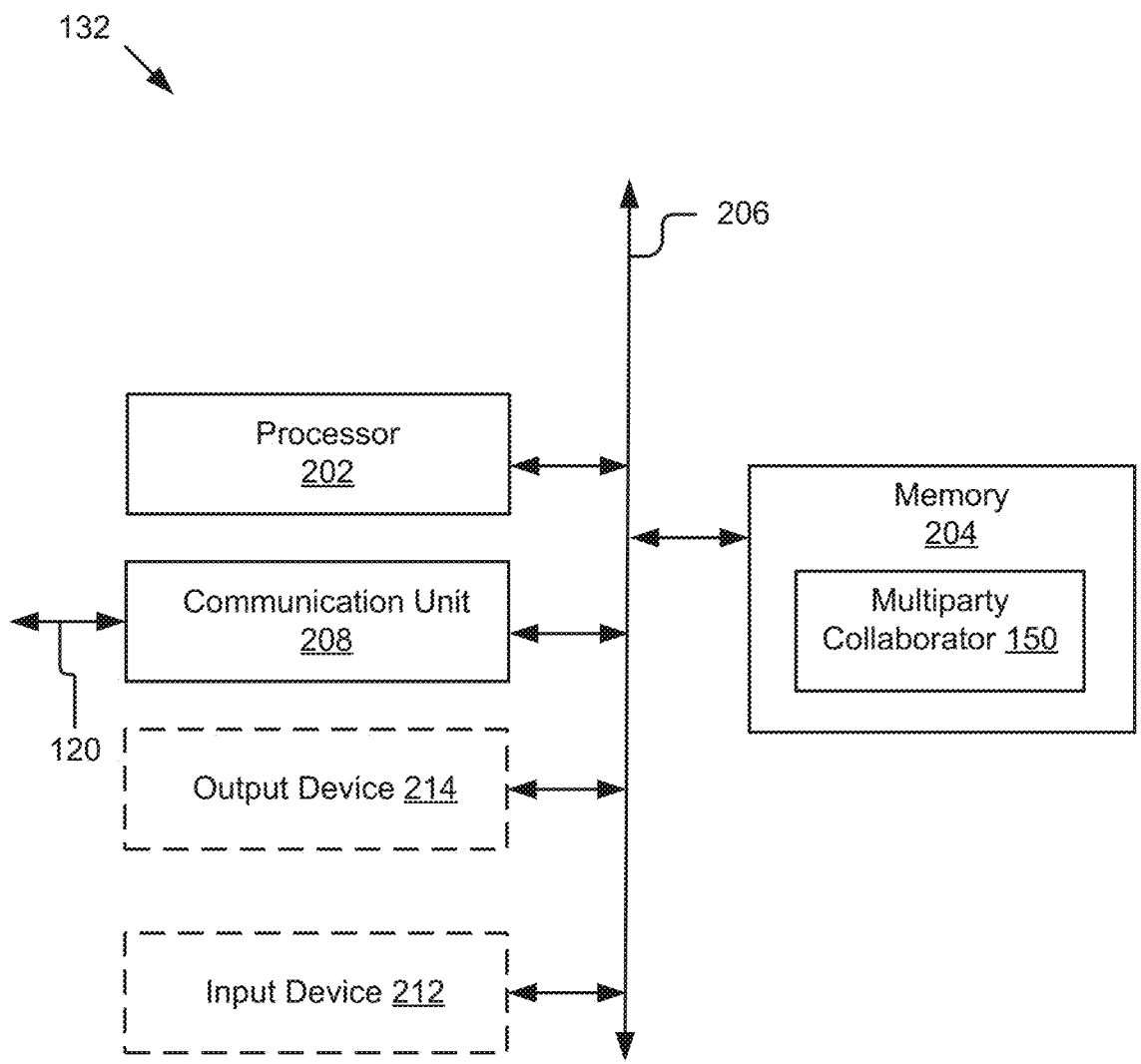
FIG. 2 is a block diagram of an example server in accordance with some implementations.

FIG. 2 is a block diagram of an example server 122 including an instance of the multiparty collaborator 150. In the illustrated example, the example the server 122 includes a processor 202, a memory 204, a communication unit 208, and, optionally, an input device 212, and an output device 214.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the server 122 including, for example, the memory 204, the communication unit 208.

The memory 204 may store and provide access to data for the other components of the server 122. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in some implementations, the memory 204 may store an instance of the multiparty collaborator 150. The memory 204 is also capable of storing other instructions and data, including, for example, an operating system, hardware drivers, other software applications, databases, etc. The memory 204 may be coupled to the bus 206 for communication with the processor 202 and the other components of the server 122.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, a flash drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In some implementations, the communication unit 208 may include a port for direct physical connection to the network 102 or to another communication channel. For example, the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The input device 212 may include any device for inputting information into the server 122. In some implementations, the input device 212 may include one or more peripheral devices. For example, the input device 212 may include a keyboard, a pointing device, microphone, an image/video capture device (e.g., camera), a touch-screen display integrated with the output device 214, etc.

The output device 214 may be any device capable of outputting information from the server 122. The output device 214 may include one or more of a display (LCD, OLED, etc.), a printer, a 3D printer, a haptic device, audio reproduction device, touch-screen display, a remote computing device, etc. In some implementations, the output device 214 is a display which may display electronic images and data output by a processor for presentation to a user.

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

Figure 3:
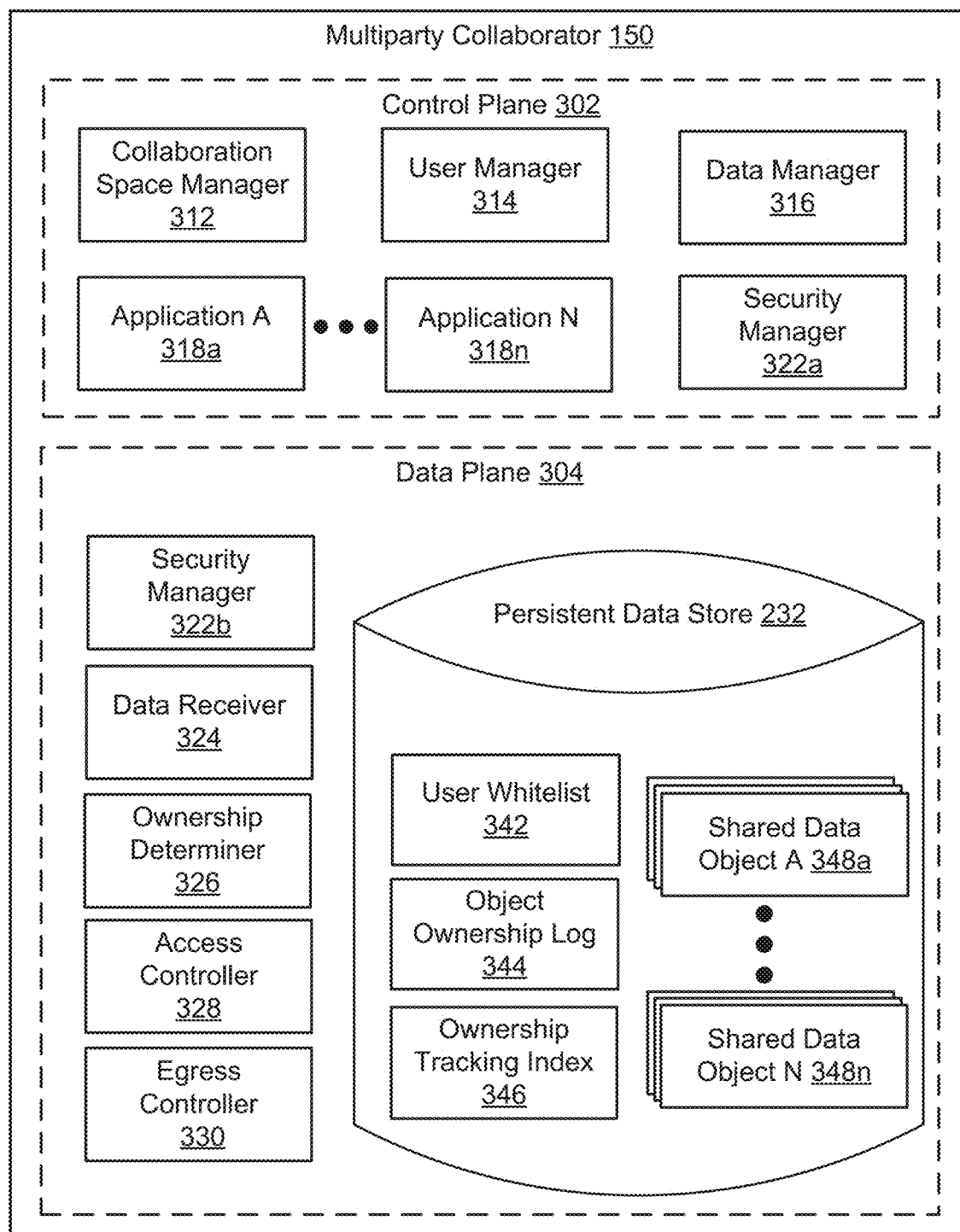
FIG. 3 are block diagrams of example multiparty collaborator in accordance with some implementations.

Referring now to FIG. 3, a block diagram of an example multiparty collaborator 150 is illustrated in accordance with some implementations. In the illustrated implementation of FIG. 4, the multiparty collaborator 150 includes a collaboration space manager 312, a user manager 314, a data manager 316, one or more applications 318a-n, one or more security managers 322a/b, a data receiver 324, an ownership determiner 326, an access controller 338, an egress controller 330, a persistent data store 232. While the illustrated implementation shows two applications, i.e., 318a and 318n, it should be recognized that the description applies to any number of applications 318.

The illustrated implementation of the persistent data store 232 includes a user whitelist 342, an object ownership log 344, an ownership tracking index 346, and shared data object A 348a through shared data object N 348n. In the illustrated implementation, shared object A 348n and shared data object N 348n are associated with multiple boxes indicating multiple versions of those objects 348a and 348n. In some implementations, a new version of an object is saved as a new object. While the illustrated implementation shows two shared data objects, i.e., 348a and 348n, it should be recognized that the description applies to any number of shared data objects having any number of versions. It should be recognized the description uses the term "data object" to refer to a digital asset such as, but not limited to, data, data objects, logging, database information, images, audio, software, methods, AI training models, AI inference model, etc. Therefore, other digital assets are within the scope of the disclosure and may be represented by shared data objects A-N 318a/n in FIG. 3. Additionally, the data objects are not necessarily all of a same type. For example, in some implementations and use cases, the persistent data store 232 may store data (a first data object), a data object (a second data object), a log (a third data object), database information (fourth data object), images (fifth data object), audio (sixth data object), software (seventh data object), method (eighth data object), AI training model (nineth data object), AI inference model (tenth data object), are any combination, sub-combination, or permutation thereof.

In some implementations, the multiparty collaborator 150 and its features and functionalities are optionally divided into a control plane 302 and a data plane 304 as illustrated by the dash-lined boxes. In some implementations the control plane 302, the data plane 304, or both represent containers, virtual machines, or a mixture thereof. A container provides an isolated environment for the contained components (e.g., the collaboration space manager 312, the user manager 314, the data manager 316, the one or more applications 418a-n, and a security manager 322a, in the case of the control plane 302, and the security manager 322b, the data receiver 324, the ownership determiner 326, the access controller 328, the egress controller 330, and the data 342/344/346/348a-n stored and maintained in the persistent data store, in the case of the data plane 304). A virtual machine may include an instance of one or more of the control plane 302 and the data plane 304, and executes the control plane 302, including components 312/314/316/318a-n/322a thereof, and/or the data plane 304, including components 322b/324/326/328/330, like a physical machine or server.

In some implementations, the control plane 302 establishes a collaboration space, also occasionally referred to herein as a collaborative environment or similar, and associated structures (e.g., a user whitelist 342, an object ownership log 344, and an ownership tracking index 346), and hosts one or more applications 318a-n that may generate, use, or manipulate collaboration data stored using the associated structures. In some such implementations, the data plane 304 may use the structures established by the control plane 302, and stored in the persistent data store 232 associated with the data plane 304, to store and maintain collaboration data and prevent unauthorized access and copying of the collaboration data, and thereby prevent leakage.

In some implementations, the control plane 302 passes one or more of a user whitelist 342, an object ownership log 344, and an ownership tracking index 346 to the data plane 304. For example, the control plane 302 is communicatively coupled to the data plane 304 to send the one or more of a user whitelist 342, an object ownership log 344, and an ownership tracking index 346. In another implementation, the control plane 302 stores the one or more of a user whitelist 342, an object ownership log 344, and an ownership tracking index 346 in memory 204 (or any other non-transitory storage medium communicatively accessible), and the data plane 304 may retrieve the one or more of a user whitelist 342, an object ownership log 344, and an ownership tracking index 346 by accessing the memory 204 (or other non-transitory storage medium).

For clarity and convenience, the description herein refers to an example scenario in which a first entity, referred to herein as Yellow Corp. or similar, and users associated with Yellow Corp. collaborate with a second entity, referred to herein as Blue Corp. or similar, and users associated with Blue Corp. For example, Yellow Corp. may be a company that lacks in-house data science capabilities, resources, or expertise, and Blue Corp. may offer data science services such as data scientists, industry experience, knowhow, algorithms, code, applied statistical skills, etc. In such an example scenario, multilateral protection is desirable. For example, Yellow Corp.'s may provide data that is sensitive to one or more of Yellow Corp. (e.g., customer lists, trade secrets, etc.), its customers (e.g., user histories, profiles, medical records), and regulators (e.g., medical records, information about minors, financial information, etc.). Yellow Corp., therefore, does not want to risk leakage, which could result in loss of competitive advantage, loss of customers, loss of revenue, fines, penalties, etc. Blue Corp. may have code and algorithms, which result in superior machine learning models compared to Blue Corp. competitors. Blue Corp.'s code and algorithms may be protected by trade secret, and, therefore, maintaining the secret by restricting access and copying is desirable for Blue Corp.

It should be recognized that the above scenario is merely a non-limiting example provided for clarity and convenience. It should further be recognized that the description herein is not limited to collaboration by two parties, and may include any number of parties, and provides efficient mechanisms for permitting collaboration protecting the data of all collaborating parties. To summarize and simplify, the features and functionalities herein are highly scalable for implementations including a large number of collaborators (e.g., federated learning), and protecting the data of the respective collaborators.

The collaboration space manager 312 initializes and ends a collaboration. For example, the collaboration space manager 312 receives a request from a first user to establish a collaboration, and initializes the collaboration. In some implementations, the collaboration space manager 312 and is communicatively coupled to the user manager 314 to prompt the user manager 314 to establish a user whitelist 342. For example, the collaboration space manager 312 receives a request from a first user to end a collaboration, and ends the collaboration. In some implementations, the collaboration space manager 312 and is communicatively coupled to the access controller 328 and the egress controller 330 to prohibit access or egress, occasionally referred to as copying, of data from the collaboration by a non-owner.

The user manager 314 creates and maintains the user whitelist 342. The user whitelist identifies one or more users allowed to participate in the collaboration. In some implementations the type and degree of participation in the collaboration are further defined, for example, by the object ownership log 344 described below. In some implementations, the user whitelist 342 may include one or more of user identification information (e.g., a user name, a unique identifier, etc.) and user group information (e.g., a group name, a group identifier, a role within the group, such as administrator or user, etc.) for each user on the whitelist.

The user group information permits granular control of access and/or egress of data. In some implementations, the user group information may be used to establish and enforce entity-based control. For example, a first group may be associated with users employed by Yellow Corp. and a second group of users may be employed by Blue Corp. In some implementations, the user group information may be used to establish and enforce intra-entity-based control. For example, a first subset of Yellow Corp. users may be associated with a first group and a second subset of Yellow Corp. users may be associated with a second group. Depending on the use case and implementation, there may, or may not be, one or more users in common between the first and second subset of users. In some implementations, the user group information may be used to establish and enforce complex inter-entity-based controls. For example, so that a first group including Yellow Corp. users and Blue Corp. users may access a first data object owned by Red Corp., a second group of Red Corp. users cannot access any data objects owned by Yellow Corp, but a third group of Blue Corp. users can access a subset of data Objects owned by Yellow Corp. It should be recognized that the above are merely non-limiting examples, and that other variations of group membership are within the scope of this disclosure. It should be further understood that the granular control provided by the using the user group information provides an efficient mechanism for complex collaborations involving many users associated with many entities where it may be desirable to partition data access in a myriad of ways to limit access to only the group(s) of users that need the access to perform their duty.

In some implementations, the user manager 314 passes the user whitelist 342 to one or more other components of the multiparty collaborator 150 (e.g., the access controller 328 and egress controller 330). For example, the user manager 314 is communicatively coupled to the one or more other components of the multiparty collaborator 150 (e.g., the access controller 328 and egress controller 330) to send the user whitelist 342. In another implementation, the user manager 314 stores the user whitelist 342 in memory 204 (or any other non-transitory storage medium communicatively accessible, such as persistent data store 232), and the one or more other components of the multiparty collaborator 150 (e.g., the access controller 328 and egress controller 330) may retrieve the user whitelist 342 by accessing the memory 204 (or other non-transitory storage medium).

The data manager 316 creates, also referred to as establishes or generates, the object ownership log 344 and the ownership tracking index 346. In some implementations, other components of the multiparty collaborator 150 populate and maintain one or more of the object ownership log 344 and the ownership tracking index 346. For example, in some implementations, the data receiver 324 and/or the ownership determiner 326 may access and modify the object ownership log 344 and/or the ownership tracking index 346.

In some implementations, the data manager 316 passes one or more of the object ownership log 344 and the ownership tracking index 346 to the one or more other components of the multiparty collaborator 150 (e.g., the data receiver 324 and/or the ownership determiner 326). For example, the data manager 316 is communicatively coupled to the one or more other components of the multiparty collaborator 150 (e.g., the data receiver 324 and/or the ownership determiner 326) to send one or more of the object ownership log 344 and the ownership tracking index 346. In another implementation, the data manager 316 stores one or more of the object ownership log 344 and the ownership tracking index 346 in memory 204 (or any other non-transitory storage medium communicatively accessible, such as persistent data store 232), and the one or more other components of the multiparty collaborator 150 (e.g., the data receiver 324 and/or the ownership determiner 326) may retrieve one or more of the object ownership log 344 and the ownership tracking index 346 by accessing the memory 204 (or other non-transitory storage medium, such as persistent data store 232).

In some implementations, an application 318*a/n* is an application for creating data, manipulating data, using data, or a combination thereof. Examples of types of applications include, but are not limited to, a development environment, a data science tool, a machine learning algorithm, etc. The applications 318*a-n* are not all necessarily the same type. For example, the one or more applications 318*a* may include Python, the libraries associated with Python, R, Rstudio, Visual Studio Code, etc.

In some implementations, the multiparty collaborator 150 is divided into a control plane 302 associated with a first container or virtual machine and a data plane 304 associated with a second container or virtual machine. In some implementations, the division of the multiparty collaborator 150 into a control plane 302 associated with a first container or virtual machine and a data plane 304 associated with a second container or virtual machine, beneficially allows modification to the control plane (e.g., to the one or more applications 318*a-n*) after a collaboration has begun without disturbing the collaboration or the collaboration data stored and maintained by the data plane 304 (e.g., in persistent data store 232). For example, consider an implementation where application A 318*a* is Python 3.7 and an update to Python 3.9 is desirable, in some implementations, the control plane 302 in its entirety, or the instance of application A 318*a*, may be replaced with a new version. The (previously) existing data plane 304 may then interact with the new, or updated, control plane 302 and continue to enable collaboration without establishing a new collaboration, associated structures (e.g., a user whitelist 342, object ownership log 344, and ownership tracking data 346), or performing an export, transform and load of objects into a new collaborative environment or creating a new instance. To summarize and simplify, implementations in which the multiparty collaborator 150 is divided into a control plane 302 associated with a first container or virtual machine and a data plane 304 associated with a second container or virtual machine may allow a user to modify or replace the control plane 302 (or components therein) in the middle of a collaboration and resume collaboration without disruption to the collaboration data.

In some implementations, modification to the control plane 302, may require creating an entirely new image of the control plane 302 with the modification (e.g., a new image with version 3.9 of Python) to reduce the risk that malicious code may be injected into the control plane 302. In some implementations, only the one or more applications 318a-n may be used to access, copy, copy and modify collaboration data. For example, the client application 109a may not be, for example, a development environment (e.g., RStudio) with access to collaboration data, which may permit the data to be egressed at the client. Rather, the client application 109a may be a browser, light client, or other application which provides an interface via which the user 112 may interact with an instance of RStudio in the control plane 302 container of the multiparty collaborator 150 (e.g., application A 318a may be RStudio in this example).

In some implementations, the multiparty collaborator 150 is divided into a control plane 302 associated with a first container or virtual machine and a data plane 304 associated with a second container or virtual machine. In some implementations where the multiparty collaborator 150 is divided into a control plane 302 and a data plane 304, the control plane 302 includes an instance of a security manager 322a and the data plane 304 includes an instance of a security manager 322b, as illustrated in FIG. 3. In some implementations, the security manager 322a of the control plane 302 and the security manager 322b of the data plane 304 are communicatively coupled and cooperate so (1) data from the control plane 302, or component 312/314/316/318a/318n thereof, is only sent to and stored in the data plane 304 (e.g., in the persistent data store 232 of the data plane 304), (2) data (e.g., shared object data 348a/n) from the data plane 304, or component 324/326/328/330/232 thereof, is only accessed or copied through the control plane 302, or component 312/314/316/318a/318n thereof. In some implementations, the components 312/314/316/318a-n/322/324/326/328/330/232 of the multiparty collaborator 150 are not divided into separate containers and/or virtual machines, and a single instance of the security manager 322a/b may be present.

In some implementations, the security manager 322a/b provides data encryption. In some implementations, the security manager 322a/b provides data encryption for collaboration data in transit. For example, in some implementations with a separate control plane 302 and data plane 304, the security managers 322a and 322b may use, e.g., key pairs, to ensure that any collaboration data leaving the control plane 302 only arrives in a useable form (i.e., encrypted, but decryptable form) at the data plane 304 and prevent man-in-the-middle attacks, and. any collaboration data leaving the data plane 304 only arrives in a useable form (i.e., encrypted, but decryptable form) at the control plane 302 to prevent man-in-the-middle attacks.

In some implementations, the security manager 322b provides encryption for data at rest. For example, in some implementations the security manager 322 encrypts and stores, in encrypted format, one or more of the user whitelist 342, the object ownership log 344, the ownership tracking index 346, and a shared data object 348a/348n. object ownership log The types of encryption that the security manager 322a/b may utilized are too numerous to list and may vary depending on whether the encryption is for data at rest or in transit, but encryption may include, but are not limited to, advanced encryption standard (AES) 128, AES 256, elliptic curve cryptography, public/private key encryption, etc.

The security manager 322 is communicatively coupled to securely transfer and store data. For example, in some implementations, the security manager 322b is communicatively coupled to the memory 204 (or any other non-transitory storage medium, e.g., the persistent data store 232) to obtain or store encrypted data. As another example, in some implementations, the security manager 322 is communicatively coupled to one or more components of the multiparty collaborator 150 to one or more encrypted data and decrypt data.

The data receiver 324 receives, occasionally referred to as ingresses, data to be included, or "shared," in the collaboration environment, which is occasionally referred to herein as collaboration data. For example, in some implementations, the data receiver is communicatively coupled to receive collaboration data (e.g., from a client device 106 or any other data source (not shown)). For example, the data receiver 324 receives collaboration data from a data source (not shown), such as a server, service, or database associated with Yellow Corp via an FTP file transfer or Google Pub/Sub.

In some implementations, the data receiver 324 generates one or more data objects associated with the received collaboration data. In some implementations, the data receiver 324 updates one or more of the object ownership log 344 and the ownership tracking index 346 based on receiving collaboration data or a modification thereto.

In some implementations, the data receiver 324 receives modification of collaboration data. For example, the data receiver 324 receives modification of data stored in a first data object and generates a second data object associated with the modified collaboration data. The type and extent of modification may vary based on the implementation and use case. Some examples of modifications include data transformations, feature extractions, editing data, reformatting data etc.

In some implementations, the data receiver 324 generates an object ownership log 344 entry associated with the generated data object. In some implementations, an object ownership log 344 entry for an object includes object identification information that identifies the object (e.g., an object name and an object ID) and an object owner identifying an owner of the data object. In some implementations, the object owner is indicated by a group or group ID. For example, a group of users associated with Yellow Corp or with Blue Corp. In some implementations, the object owner may be an entity (e.g., Yellow Corp.).

In some implementations, the data receiver 324 generates an ownership tracking index 346 entry. The ownership tracking index 346 tracks activity using entries. In some implementations, an ownership tracking index 346 entry may include object identification information (e.g., an object ID and name), an owner, and an index.

In some implementations, the data receiver 324 is communicatively coupled with one or more other components of the multiparty collaborator 150 and the passes one or more of the object ownership log 344, the ownership tracking index 346, and a shared data object 348a/348n to the one or more other components of the multiparty collaborator 150 (e.g., access controller 328 and/or egress controller 330). In another implementation, the data receiver 324 stores one or more of the object ownership log 344, the ownership tracking index 346, and a shared data object 348a/348n in memory 204 (or any other non-transitory storage medium, such as persistent data store 232), and the one or more other components of the multiparty collaborator 150 (e.g. access controller 328 and/or egress controller 330) may retrieve one or more of the object ownership log 344, the ownership tracking index 346, and a shared data object 348a/348n by accessing the memory 204 (or other non-transitory storage medium, such as the persistent data store 232).

The ownership determiner 326 determines ownership of a data object. In some implementations, the ownership determiner 326 determines an owner at ingress of the collaboration data into the collaboration. For example, the user initiating the data ingress may identify an owner. In another example, the ownership determiner 326 determines (e.g., from the entry representing the user in the user whitelist 342) a group associated with the user inputting the data into the collaboration, and assigns that group (or the associated group identifier) as the resulting object's owner in one or more of the object ownership log 344 and the ownership tracking index 346.

The ownership determiner 326 determines an owner of an object generated based on a modification to data of a pre-existing data object. For example, when a non-owner modifies data and a new data object is generated; in some implementations, the ownership determiner 326 determines an owner (i.e., the owner of the prior object, which stored the data pre-modification) to be associated with the newly generated data object. In some implementations, the ownership determiner 326 performs a content-based analysis to determine the owner of the modified data, and the object created to store the modified data. For example, in some implementations, the ownership determiner 326 determines whether the newly generated data object is a derivative of the pre-existing data object, and, when it is, assigns ownership of the newly generated data object to the owner of the pre-existing data object.

In some implementations, the ownership determiner 326 determines ownership when an object is stored into the persistent data store 232. For example, when a data object associated with data being ingressed is stored as an object, the ownership determiner 326 determines the owner. As another example, when a data object that is a modified version of a prior data object is stored as a new object, the ownership determiner 326 determines the owner of the object that is the modified version of the prior object and updates the object ownership log 344. In some implementations, the ownership determiner 326 determines ownership when an object is requested for access or egress. For example, the ownership determiner 326 access the index for the requested object and analyzes the index (or block chain of activity log) to track changes to and evolution of the data and determine the owner of the object requested for access or egress.

Figure 5A:
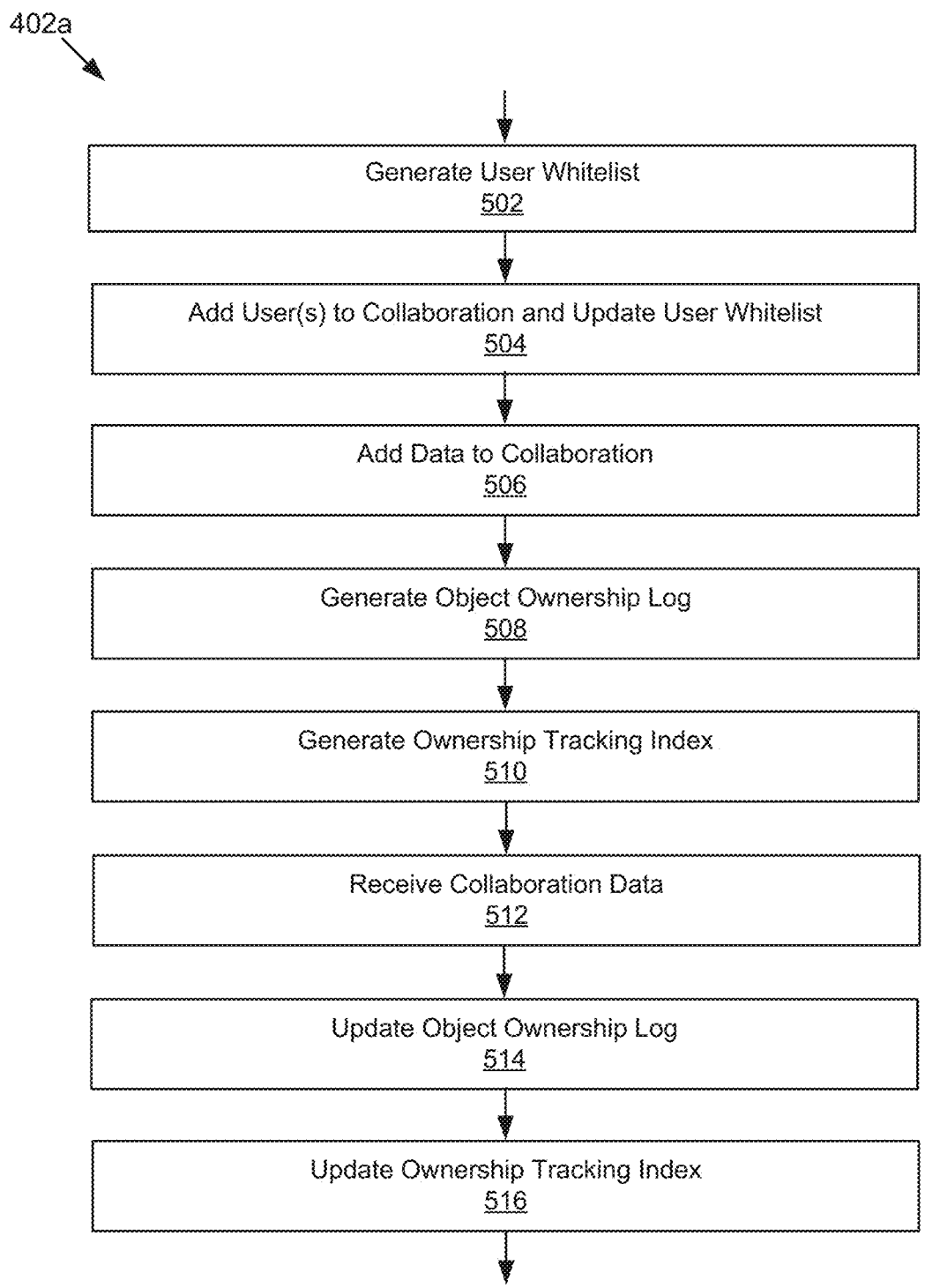
FIG. 5A is a flowchart of an example method for initializing a collaboration in accordance with some implementations.
Figure 5B:
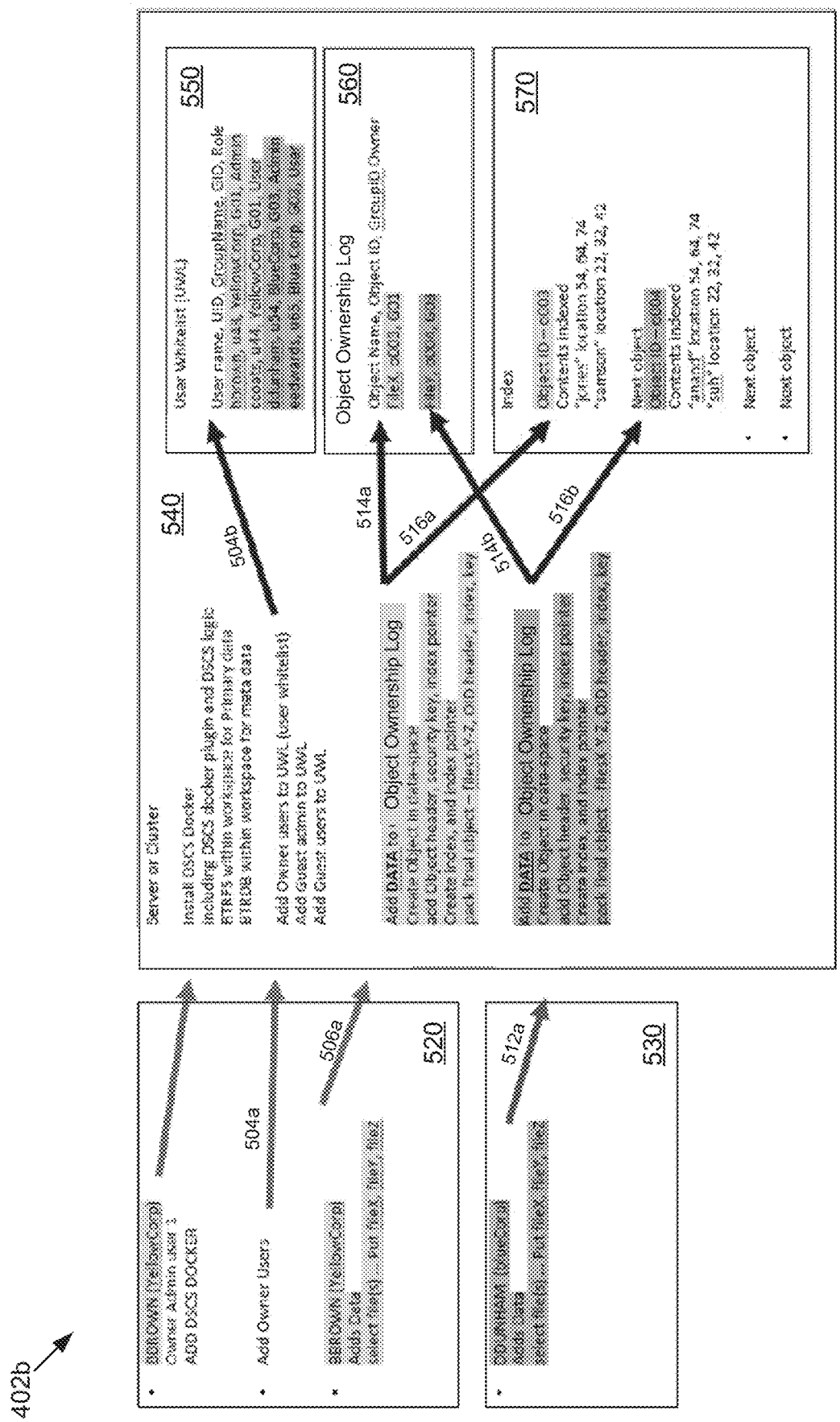
FIG. 5B is a diagram of another example method for initializing a collaboration in accordance with some implementations.

In some implementations, activity (e.g., requests and modifications) is logged in the ownership tracking index 346, examples of such implementations are illustrated in FIGS. 5B and 5C. In some implementations, the activity may be logged and maintained using block chain.

The content-based analysis may vary based on the implementation and use case. In some implementations, the ownership determiner 326 determines whether the newly generated data object sufficiently matches the pre-existing data object, and, when a sufficient match is determined, assigns ownership of the newly generated data object to the owner of the pre-existing data object. In some implementations, a sufficient match is associated with a threshold, which, depending on the implementation, may be set by the system (e.g., hard coded) or set by for the specific collaboration environment (e.g., by the collaboration owner, and in some implementations, based on agreement by the collaborating entities). In some implementations, the match is based on a comparison.

In some implementations, the ownership determiner 326 is communicatively coupled to the data receiver 324 to obtain the pre-existing data object and the newly created data object for comparison. In some implementations, the ownership determiner 326 is communicatively coupled to the persistent data store 232 to obtain the pre-existing data object and the newly created data object for comparison. In some implementations, the ownership determiner 326 is communicatively coupled to one or more other components of the multiparty collaborator 150 and the passes one or more of the object ownership log 344 (e.g., an updated version) and the ownership tracking index 346 (e.g., an updated version) to the one or more other components of the multiparty collaborator 150 (e.g., access controller 328 and/or egress controller 330). In another implementation, the data receiver 324 stores one or more of the object ownership log 344 and the ownership tracking index 346, in memory 204 (or any other non-transitory storage medium, such as persistent data store 232), and the one or more other components of the multiparty collaborator 150 (e.g. access controller 328 and/or egress controller 330) may retrieve one or more of the object ownership log 344 and the ownership tracking index 346 by accessing the memory 204 (or other non-transitory storage medium, such as the persistent data store 232).

The access controller 328 determines whether to grant access to data in collaborative environment responsive to receiving a request. The access controller 328 is communicatively coupled to receive a user request. In some implementations, the access controller is communicatively coupled to one or more of obtain an owner of the requested object from the object ownership log 344, obtain the user whitelist 342 in order to determine whether the requesting user is associated with the object owner, and grant access to, or obtain and send for presentation, the requested data object.

In some implementations, the access controller 328 determines, responsive to receiving the access request, whether the collaboration is active or has ceased, which may also be referred to herein as terminated or similar. In some implementations, different rules govern access based on whether a collaboration is on-going or terminated. For example, in some implementations, only users associated with an owner may access a data object after termination of the collaboration, while during collaboration, access is available to any user on the user whitelist 342 for the collaboration. In some embodiments, the access controller 328 determines an owner of the data object for which access is requested and determines whether or not grant access based on the ownership of the data object and a collaboration status (e.g., on-going or terminated).

The egress controller 330 determines whether to grant egress, occasionally referred to herein as allowing copy or similar, of data from the collaborative environment responsive to receiving a request. For example, when the egress controller 330 receives a request from a user, who is on the user whitelist and has access to the collaborative environment, to copy a shared data object from the collaborative environment to a destination outside the multiparty collaborator 150, in some determines whether the requesting user is associated with the owner of the shared data object and either denies copy when the user is not associated with the owner of the shared data object or allows copy when the user is associated with the owner of the data object. In some implementations, egress controller 330 allows a non-owner to request egress and egresses the data responsive to approval by an owner (e.g., a user associated with the owner that has authorization privileges).

The egress controller 330 is communicatively coupled to receive a user request. In some implementations, the access controller is communicatively coupled to one or more of obtain an owner of the requested object from the object ownership log 344, obtain the user whitelist 342 in order to determine whether the requesting user is associated with the object owner, and grant egress of the requested data object responsive to one or more of association of the user with the object owner (i.e., the copy is requested by a user associated with the object owner) and consent (i.e., the copy is approved by a user, such as an admin, associated with the object owner).

Example Methods

FIGS. 4-8B are flowcharts and diagrams of example methods that may, in accordance with some implementations, be performed by the systems described above with reference to FIGS. 1-3. The methods FIGS. 4-8B are provided for illustrative purposes, and it should be understood that many variations exist and are within the scope of the disclosure herein.

Figure 4:
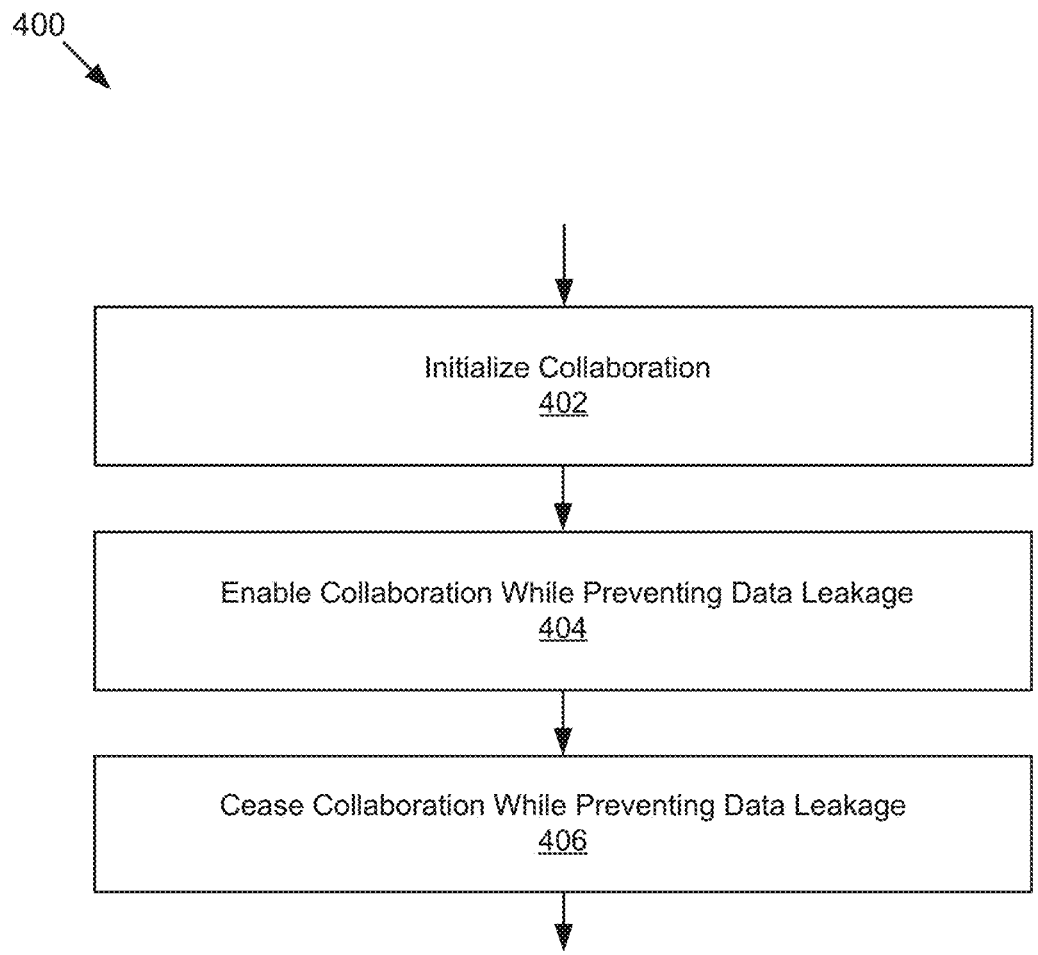
FIG. 4 is a flowchart of an example method for multi-party data science collaboration in accordance with some implementations.

FIG. 4 is a flowchart of an example method 400 for multi-party data science collaboration in accordance with some implementations. At block 402, the multiparty collaborator 150 initializes a collaboration. At block 404, the multiparty collaborator 150 enables collaboration while preventing data leakage. At block 406, the multiparty collaborator 150 ceases collaboration while preventing data leakage.

FIG. 5A is a flowchart of an example method 402a for initializing a collaboration in accordance with some implementations. At block 502, the user manager 314 generates a user whitelist for the collaboration. At block 504, the user manager 314 adds one or more users to the collaboration. For example, one or more of user(s) associated with the collaboration owner (e.g., Yellow Corp. user(s)), an administrative user of a collaboration guest (e.g., a Blue Corp. admin user), and a collaboration guest user(s) (e.g., a Blue Corp. user(s)) is added. At block 506, the data receiver 324 adds data to the collaboration. For example, the data receiver 324 creates an object. At block 508, the data manager 316 generates an object ownership log 344. For example, the data manager 316 generates the object ownership log and the data receiver 324 adds an object name and an owner for an object associated with the data, received at block 506, to the object ownership log. At block 510, the data manager 316 generates an ownership tracking index. For example, the data manager 316 generates the ownership tracking index and the ownership determiner 326 adds the object associated with the data, received at block 506, to the ownership tracking index 346. At block 512, the data receiver 324 receives collaboration data. For example, from an FTP file transfer or Google PUB/SUB. At block 514, the data receiver 324 updates the object ownership log 344. For example, the ownership determiner 326 updates the object ownership log 344 with an object ID and an owner for an object associated with the data, received at block 514, to the object ownership log 344. At block 516, the ownership determiner 326 updates the ownership tracking index 346. For example, the ownership determiner 326 updates the ownership tracking index and adds the object associated with the data, received at block 514, to the ownership tracking index.

FIG. 5B is a diagram of another example method 402b for initializing a collaboration in accordance with some implementations. As illustrated, box 520 includes descriptions of actions of Yellow Corp. user(s), box 530 includes a description of an action by a Blue Corp. user, box 540 describes actions by the system described in FIGS. 1-3, box 550 includes an example user whitelist, box 560 includes an example object ownership log, and box 570 includes an example ownership tracking index according to one implementation. In the illustrated example, the arrows associate a user action 520/530 to a system action 540, and an entry, when applicable, to one or more of the user whitelist 550, the object ownership log 560, and the ownership tracking index 570.

In the illustrated scenario, user BBROWN of Yellow Corp. begins the initialization of the collaboration, so Yellow Corp. may be referred to as the "owner" of the collaboration and BBROWN is the owner admin user, and "bbrown, u43, YellowCorp, G01, Admin" is added to the user whitelist 550, where "bbrown" is the username, "u43" is the user ID, "YellowCorp" is the group name, and "G01" is the group ID. BBROWN adds "Owner Users" (i.e., users associated with Yellow Corp) to the collaboration, which, as indicated by arrow 504a, causes the system to add the Owner users to the whitelist, which, as indicated by arrow 504b, updates the user whitelist 550 to include "ccoats, u44, Yellow Corp., G01, User." DDUNHAM has been added (not shown) as the administrative user for a Guest (i.e., Blue Corp.) and has added (not shown) another Blue Corp. user eedwards, which, as represented by arrow 504b, updated the user whitelist 550 to include "ddunham, u54, BlueCorp, G03, Admin" and "eedwards, u65, BlueCorp, G03, User," as illustrated.

BBROWN adds data to the collaboration, which causes, as indicated by arrow 506a, the system to create an object and add, as represented by arrow 514a, an entry "FileX, o003, G01" associated with that object to the object ownership log 560, where "FileX" is the object name, "o003" is the Object ID, and "G01" is the Group ID of the object's owner. The system also adds, as represented by arrow 516a, the entry 'Object ID-o003 . . . "samson" location 22, 32, 42' to the ownership tracking index 570.

DDUNHAM adds data to the collaboration, which causes, as indicated by arrow 512b, the system to create an object and add, as represented by arrow 514b, an entry "FileY, o004, G03" associated with that object to the object ownership log 560, where "FileY" is the object name, "o004" is the Object ID, and "G03" is the Group ID of the object's owner. The system also adds, as represented by arrow 516b, the entry 'Object ID-o004 . . . "suh" location 22, 32, 42' to the ownership tracking index 570.

Figure 6A:
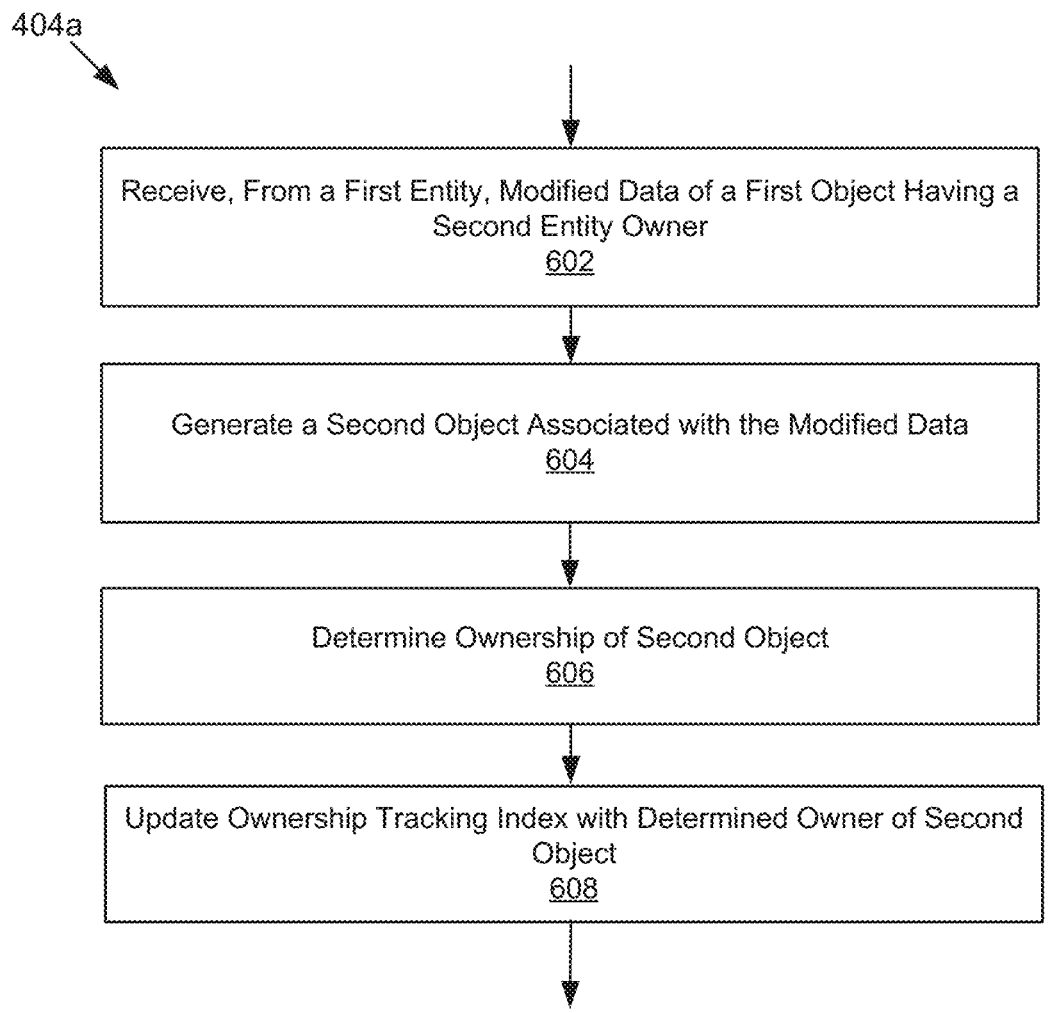
FIG. 6A is a flowchart of an example method for enabling collaboration while preventing data leakage in accordance with some implementations.

FIG. 6A is a flowchart of an example method 404 for enabling collaboration while preventing data leakage according to some implementations. At block 602, the data receiver 324 receives, from a first entity, modified data of a first object having a second entity owner. At block 604, the data receiver 324 generates a second object associated with the modified data. At block 606, the ownership determiner 326 determines ownership of the second object. At block 608, the ownership determiner 326 updates the ownership tracking index with owner of the second object, which was determined at block 606.

Figure 6B:
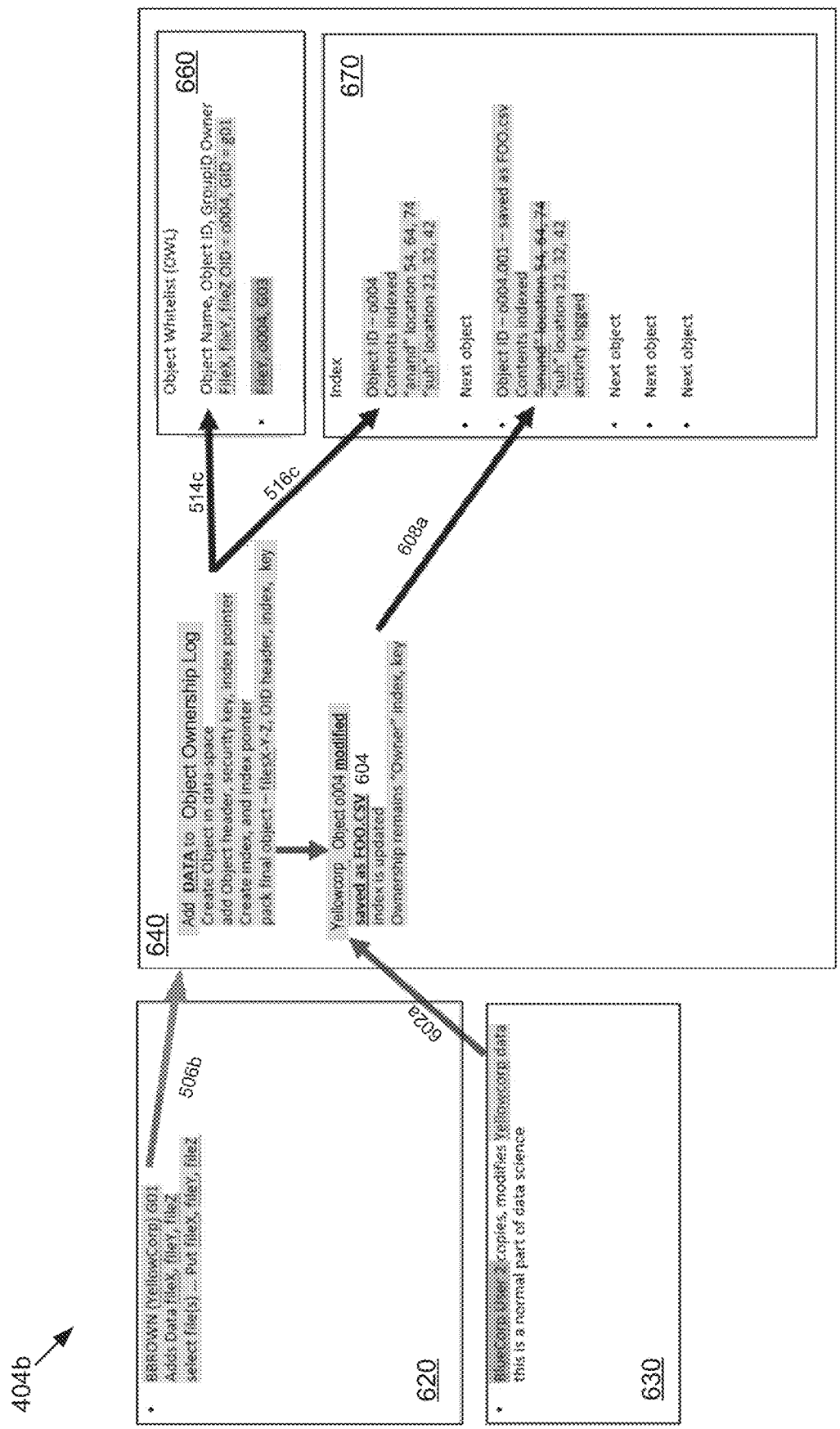
FIG. 6B is a diagram of another example method for enabling collaboration while preventing data leakage in accordance with some implementations.

FIG. 6B is a diagram of another example method 404 for enabling collaboration while preventing data leakage in accordance with some implementations. As illustrated, box 620 includes descriptions of actions of Yellow Corp. user(s), box 630 includes a description of an action by a Blue Corp. user, box 640 describes actions by the system described in FIGS. 1-3, box 660 includes an example object ownership log, and box 670 includes an example ownership tracking index according to one implementation. In the illustrated example, the arrows associate a user action 620/630 to a system action 640, and an entry, when applicable, to one or more of the object ownership log 660 and the ownership tracking index 670.

In the illustrated scenario, user BBROWN of Yellow Corp. adds data to the collaboration, as indicated by arrow 506b, the system creates an object and adds, as represented by arrow 514c, an entry "FileX, fileY, fileZ, OID=o003, GID=g01" associated with that object to the object ownership log 660, where "FileX, fileY, fileZ" is the object name, "o003" is the Object ID, and "g01" is the Group ID of the object's owner. The system also adds, as represented by arrow 516c, the entry 'Object ID-o003 . . . "suh" location 22, 32, 42' to the ownership tracking index 570.

BlueCorp User 2 copies and modifies Yellow Corp's data. As indicated by arrow 602a, the system modifies Object o004 and saves, at 604a, the modified data as a new "FOO.CSV" object with object ID o004.001, and updates, as represented by arrow 608a, the ownership tracking index 670.

Figure 7:
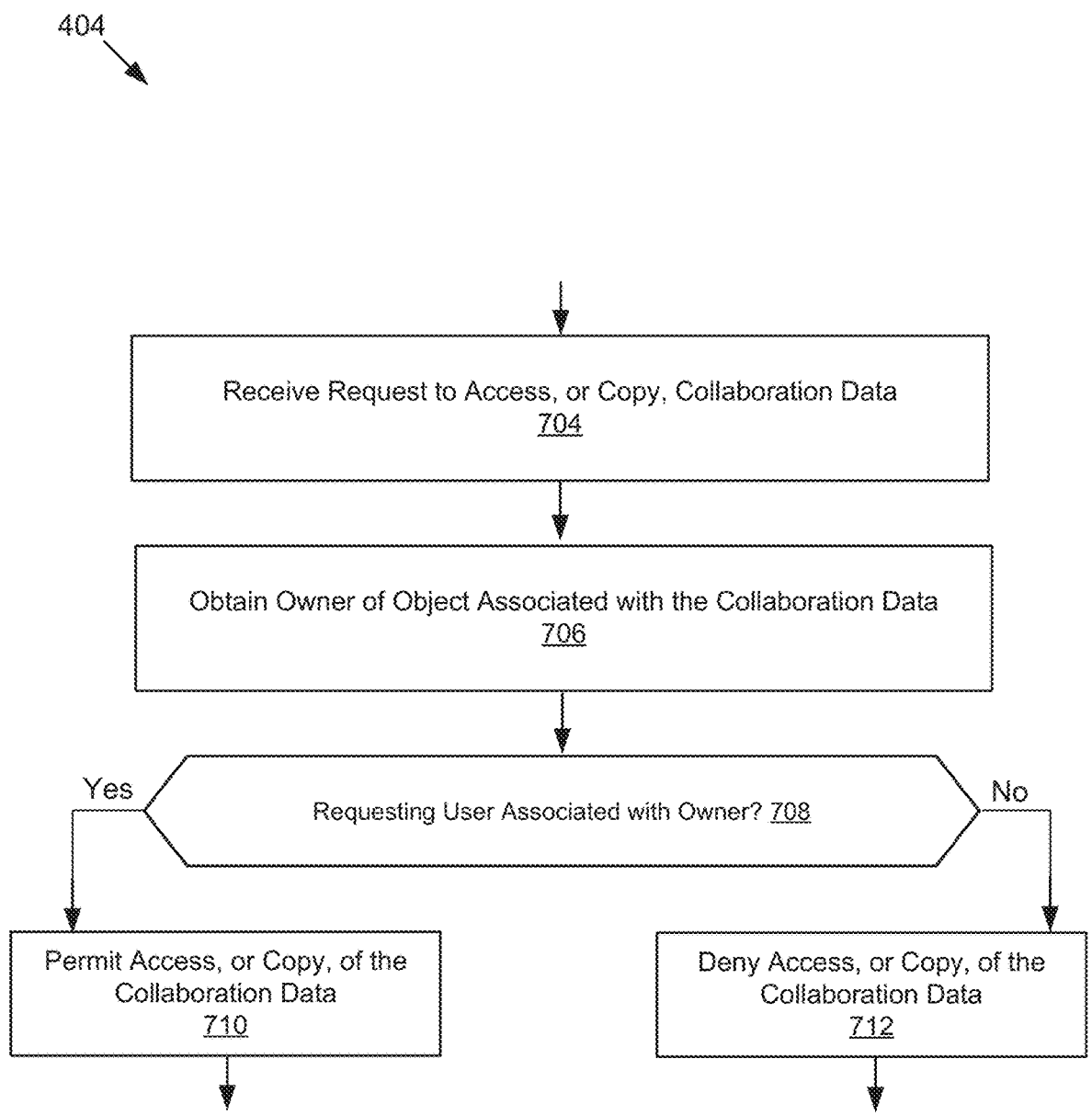
FIG. 7 is a flowchart of an example method for collaborating while preventing data leakage in accordance with some implementations.

FIG. 7 is a flowchart of an example method 406 for collaborating while preventing data leakage in accordance with some implementations. At block 702, the collaboration space manager 312 receives a request to cease collaboration. At block 704, the access controller 328, or egress controller 330, receives a request to access, or copy respectively, collaboration data. At block 706, the access controller 328, or egress controller 330, obtains the owner of the object associated with the collaboration data, requested at block 704, from the ownership tracking index. At block 708, the access controller 328, or egress controller 330 determines whether the user, associated with the request received at block 704, is associated with the owner, obtained at block 706, from the ownership tracking index.

When the requesting user is associated with the owner in the ownership tracking index (708—Yes), the access controller 328, or egress controller 330, permits, at block 710, the requested access, or copy, respectively, of the collaboration data. When the requesting user is associated with the owner (708—No), the access controller 328, or egress controller 330, denies, at block 712, the requested access, or copy respectively, of the collaboration data.

Figure 8A:
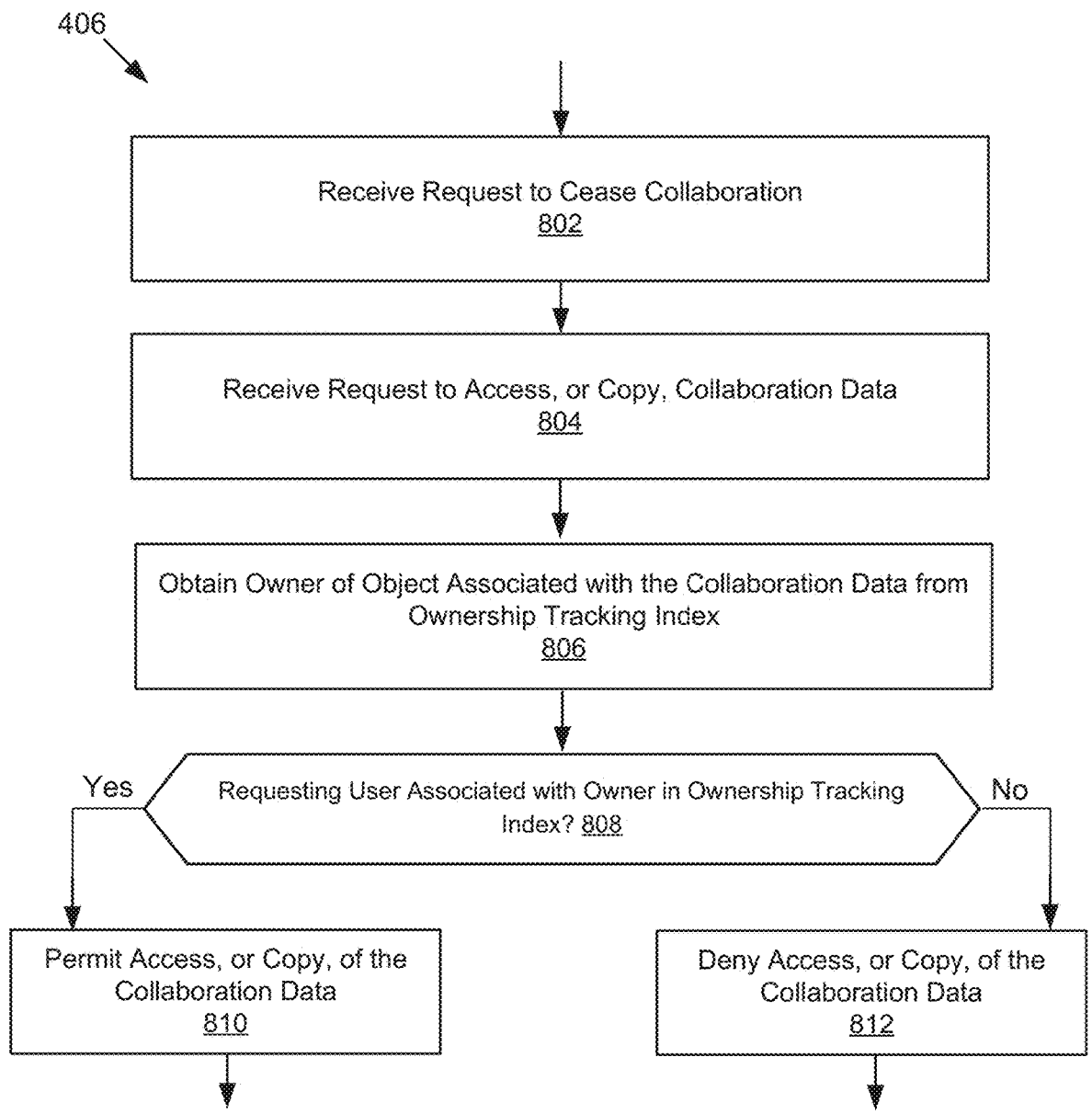
FIG. 8A is a flowchart of an example method for ceasing collaboration in accordance with some implementations.

FIG. 8A is a flowchart of an example method 406 for ceasing collaboration while preventing data leakage in accordance with some implementations. At block 802, the collaboration space manager 312 receives a request to cease collaboration. At block 804, the access controller 328, or egress controller 330, receives a request to access, or copy respectively, collaboration data. At block 806, the access controller 328, or egress controller 330, obtains the owner of the object associated with the collaboration data, requested at block 804, from the ownership tracking index. At block 808, the access controller 328, or egress controller 330, determines whether the user, associated with the request received at block 804, is associated with the owner, obtained at block 806, from the ownership tracking index.

When the requesting user is associated with the owner in the ownership tracking index (808—Yes), the access controller 328, or egress controller 330, permits, at block 810, the requested access, or copy respectively, of the collaboration data. When the requesting user is associated with the owner (808—No), the access controller 328, or egress controller 330, denies, at block 812, the requested access, or copy respectively, of the collaboration data.

Figure 8B:
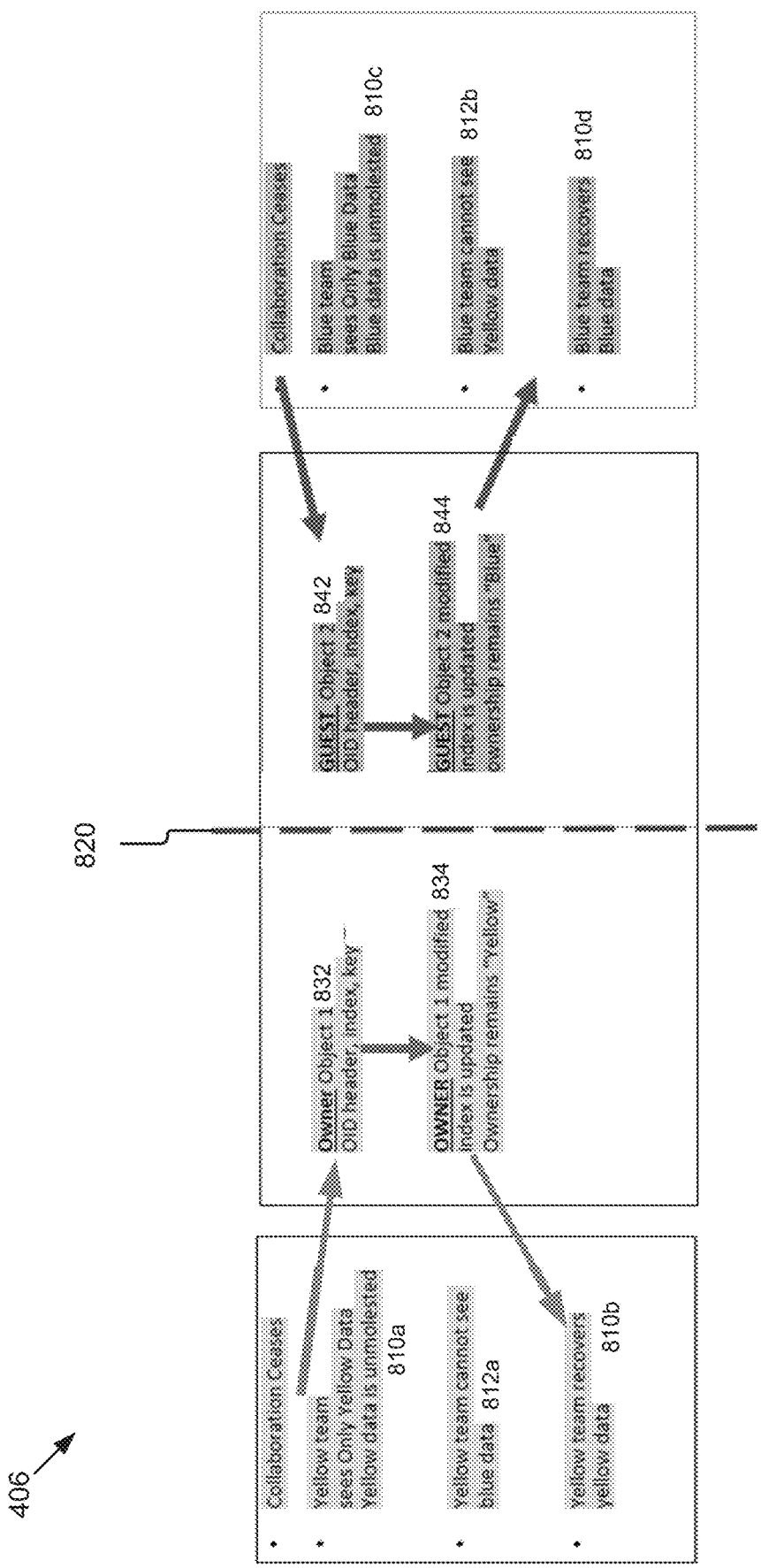
FIG. 8B is a diagram of another example method for ceasing collaboration in accordance with some implementations.

FIG. 8B is a diagram of another example method 406 for ceasing collaboration while preventing data leakage in accordance with some implementations. The collaboration has ceased. As represented by dashed line 820, after the collaboration ceases, the system no longer allows non-owners to access or copy data, which is represented by "Object 1" and "Object 1 modified" on the left of dashed line 820, as they are associated with the collaboration "Owner" (i.e., Yellow Corp.), and Object 2" and "Object 2 modified" on the right of dashed line 820, as they are associated with the collaboration "Guest" (i.e., Blue Corp.)

As indicated at 810a, the Yellow Corp. team may see only Yellow Corp. data, and the Yellow Corp. data is unmolested "Object 1." For example, as indicated at 832, "Object 1" is owned by the collaboration "Owner" (i.e., Yellow Corp.). As indicated at 810b, the Yellow Corp. can recover Yellow Corp. data including data modified during collaboration, such as "Object 1 modified," for which Yellow Corp. remains the owner in the ownership tracking index. As indicated at 812a, the Yellow Corp. team may not access Blue Corp. data.

As indicated at 810c, the Blue Corp. team may see only Blue Corp. data, and the Blue Corp. data "Object 2" is unmolested. For example, as indicated at 842, "Object 2" is owned by the collaboration "Guest" (i.e., Blue Corp.). As indicated at 810d, the Blue Corp. can recover Blue Corp. data including data modified during collaboration, such as "Object 12 modified," for which Blue Corp. remains the owner in the ownership tracking index. As indicated at 812b, the Blue Corp. team may not access Yellow Corp. data.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic optical disks, read-only memories (ROMs), random access memories (RAMs), EPROMs, EEPROMs, magnetic or optical cards, or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a flash memory, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. for determining climate risk using artificial intelligence. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is described with reference to a particular programming language. It will be appreciated that a variety of programming languages may be used to implement the teachings of the disclosure as described herein.

What is claimed is:

1. A computer implemented method comprising:
    creating, using one or more processors, a first data object associated with first collaboration data, the first collaboration data associated with a first collaborating entity;
    generating, using the one or more processors, a first object ownership log entry to an object ownership log associated with a collaboration, the first object ownership log entry including first identification information identifying the first data object and a first object owner identifying an owner of the first data object, wherein the first object owner associated with the first data object is the first collaborating entity;
    generating, using the one or more processors, a first object tracking index entry associated with the first data object to a ownership tracking index;
    receiving, using the one or more processors, a user request associated with the first data object, wherein the request is to modify the first collaboration data associated with the first data object and the request is received from a user unassociated with the first object owner;
    receiving a modification to the first collaboration data associated with the first data object;
    creating a second data object associated with the modified first collaboration data;
    determining ownership of the second data object is the first object owner, wherein determining the ownership of the second data object further comprises:
        comparing the first data object and the second data object; and
        determining the second data object is derived from first data object;
    responding, using the one or more processors, to the user request based on one or more of a user whitelist, the object ownership log, and the ownership tracking index; and
    wherein a data plane container performs the creation of the first data object, the generation of the first object ownership log entry, and the generation of the first object tracking index entry, and wherein a control plane container establishes the user whitelist, the object ownership log, and the ownership tracking index.

2. The computer implemented method of claim 1, wherein another user request is received to copy the first data object to a destination outside a multiparty collaborator, the method further comprising:
    determining, using the first object ownership log entry, a first group as the first object owner;
    determining, using the user whitelist, whether the requesting user is associated with the first group, wherein the user whitelist includes the user; and denying copy of the first data object to the destination outside the multiparty collaborator responsive to determining the requesting user is not associated with the first group; and allowing copy of the first data object to the destination outside the multiparty collaborator responsive to determining the requesting user is associated with the first group.

3. The computer implemented method of claim 1 further comprising:

receiving a request to cease collaboration, wherein another user request is received to access or copy the first data object subsequent to the request to cease collaboration;

determining, using the first object ownership log entry, a first group as the first object owner;

determining, using the user whitelist, whether the requesting user is associated with the first group; and denying access or copy of the first data object responsive to determining the requesting user is not associated with the first group; and allowing access or copy of the first data object responsive to determining the requesting user is associated with the first group.

4. The computer implemented method of claim 1, wherein determining that the second data object is derived from the first data object is based on satisfaction of a threshold level of matching.

5. The computer implemented method of claim 1, wherein the user whitelist includes a user name, a unique identifier, a group name, a group identifier, and a role for each user on the whitelist.

6. The computer implemented method of claim 5, wherein a group includes users from multiple different entities.

7. The computer implemented method of claim 5, wherein a group includes users from a common entity.

8. A system comprising:

a processor; and a memory, the memory storing instructions that, when executed by the processor, cause the system to:

create a first data object associated with first collaboration data, the first collaboration data associated with a first collaborating entity;

generate a first object ownership log entry to an object ownership log associated with a collaboration, the first object ownership log entry including first identification information identifying the first data object and a first object owner identifying an owner of the first data object, wherein the first object owner associated with the first data object is the first collaborating entity;

generate a first object tracking index entry associated with the first data object to a ownership tracking index;

receive a user request associated with the first data object, wherein the request is to modify the first collaboration data associated with the first data object and the request is received from a user unassociated with the first object owner;

receive a modification to the first collaboration data associated with the first data object;

create a second data object associated with the modified first collaboration data;

determine ownership of the second data object is the first object owner, wherein determining the ownership of the second data object further comprises:

comparing the first data object and the second data object; and determining the second data object is derived from first data object;

respond to the user request based on one or more of a user whitelist, the object ownership log, and the ownership tracking index; and wherein a data plane container performs the creation of the first data object, the generation of the first object ownership log entry, and the generation of the first object tracking index entry, and wherein a control plane container establishes the user whitelist, the object ownership log, and the ownership tracking index.

9. The system of claim 8, wherein another user request is received to copy the first data object to a destination outside a multiparty collaborator, the method further comprising:

determining, using the first object ownership log entry, a first group as the first object owner, wherein the user whitelist includes the use;

determining, using the user whitelist, whether the requesting user is associated with the first group; and denying copy of the first data object to the destination outside a multiparty collaborator responsive to determining the requesting user is not associated with the first group; and allowing copy of the first data object to the destination outside a multiparty collaborator responsive to determining the requesting user is associated with the first group.

10. The system of claim 8, the memory further storing instructions that, when executed by the processor, cause the system to:

receive a request to cease collaboration, wherein another user request is received to access or copy the first data object subsequent to the request to cease collaboration;

determine, using the first object ownership log entry, a first group as the first object owner;

determine, using the user whitelist, whether the requesting user is associated with the first group; and deny access or copy of the first data object responsive to determining the requesting user is not associated with the first group; and allow access or copy of the first data object responsive to determining the requesting user is associated with the first group.

11. The system of claim 8, wherein determining that the second data object is derived from the first data object is based on satisfaction of a threshold level of matching.

12. The system of claim 8, wherein the user whitelist includes a user name, a unique identifier, a group name, a group identifier, and a role for each user on the whitelist.

13. The system of claim 12, wherein a group includes users from multiple different entities.

14. The system of claim 12, wherein a group includes users from a common entity.

* * * * *